US012810890B2

(12) United States Patent
Lee et al.

(10) Patent No.: US 12,810,890 B2
(45) Date of Patent: Nov. 24, 2026

(54) METHOD AND DEVICE FOR RECOGNIZING EMOTION OF VEHICLE OCCUPANT

(71) Applicants: Hyundai Motor Company, Seoul (KR); Kia Corporation, Seoul (KR); IUCF-HYU (Industry-University Cooperation Foundation Hanyang University), Seoul (KR)

(72) Inventors: JeeEun Lee, Hwaseong-si (KR); Kangin Lee, Hwaseong-si (KR); Yonggwon Jeon, Hwaseong-si (KR); In Young Kim, Seoul (KR); Jong Shill Lee, Seoul (KR); Joo Young Kim, Seoul (KR); Kyou Min Choi, Guri-si (KR)

(73) Assignees: Hyundai Motor Company, Seoul (KR); Kia Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 122 days.

(21) Appl. No.: 18/815,214

(22) Filed: Aug. 26, 2024

(65) Prior Publication Data

US 2025/0201266 A1 Jun. 19, 2025

(30) Foreign Application Priority Data

Dec. 13, 2023 (KR) ........................ 10-2023-0180577

(51) Int. Cl.
*G10L 25/63* (2013.01)
*G10L 25/30* (2013.01)

(52) U.S. Cl.
CPC .............. *G10L 25/63* (2013.01); *G10L 25/30* (2013.01)

(58) Field of Classification Search
CPC ......... G10L 25/63; G10L 25/30; G10L 25/03; G10L 25/24; G10L 25/15; G06N 3/0464
See application file for complete search history.

(56) References Cited

U.S. PATENT DOCUMENTS

2010/0161326 A1* 6/2010 Lee ..................... G10L 21/0208
704/278

FOREIGN PATENT DOCUMENTS

| | | | | |
|---|---|---|---|---|
| CN | 114495915 A | * | 5/2022 | ............. G10L 25/63 |
| CN | 115035916 A | * | 9/2022 | ............. G10L 25/03 |
| KR | 102541660 B1 | | 6/2023 | |

OTHER PUBLICATIONS

Cai et al., "An emotional EEG signal classification research based on deep learning." 2022 3rd International Conference on Computer Vision, Image and Deep Learning & International Conference on Computer Engineering and Applications (CVIDL & ICCEA). IEEE, 2022. (Year: 2022).*

(Continued)

*Primary Examiner* — Bhavesh M Mehta
*Assistant Examiner* — Jangwoen Lee
(74) *Attorney, Agent, or Firm* — Slater Matsil, LLP

(57) ABSTRACT

A method and a device for recognizing an emotion of a vehicle occupant. A method of recognizing an emotion of a vehicle occupant can include: acquiring data in which speech of a vehicle occupant and noise of a vehicle are mixed; preparing, from the acquired data, a first type of input data in the form of a latent vector; preparing, from the acquired data, a second type of input data in the form of a Mel-Spectrogram; inputting the first type of input data and the second type of input data into an emotion classification model; and providing, based on an output of the emotion classification model, a result of classifying an emotion of the vehicle occupant.

20 Claims, 6 Drawing Sheets

(56) References Cited

OTHER PUBLICATIONS

Zhao, Jianfeng, Xia Mao, and Lijiang Chen, "Speech emotion recognition using deep 1D & 2D CNN LSTM networks." Biomedical signal processing and control 47 (2019): 312-323. (Year: 2019).*
Pascual et al. "Learning problem-agnostic speech representations from multiple self-supervised tasks." arXiv preprint arXiv: 1904.03416 (2019) (Year: 2019).*
Ullah et al. "Speech emotion recognition using convolution neural networks and multi-head convolutional transformer." Sensors 23.13 (2023): 6212. (Year: 2023).*

* cited by examiner

20

30

| Emotion | Precision | Recall | F1 Score |
|---|---|---|---|
| Network | 0.83 | 0.87 | 0.80 |
| True neutral | 0.76 | 0.83 | 0.90 |
| Negative | 0.79 | 0.85 | 0.84 |
| Accuracy | | | 0.83 |

METHOD AND DEVICE FOR RECOGNIZING EMOTION OF VEHICLE OCCUPANT

CROSS-REFERENCE TO RELATED APPLICATIONS

This application claims the benefit of Korean Patent Application No. 10-2023-0180577, filed on Dec. 13, 2023, which application is hereby incorporated herein by reference.

TECHNICAL FIELD

The present disclosure relates to a method and a device for recognizing an emotion of a vehicle occupant.

BACKGROUND

Speech-based emotion recognition is a technology that analyzes speech data of users to determine emotions of the users. Depending on the structure of the data, speech features may be analyzed in an appropriate method, and emotions may be recognized by using the corresponding feature. Traditionally, machine learning-based classification models, such as the support vector machine (SVM), are used by using a low-level feature statistic value, such as frame energy, mel-frequency cepstral coefficient (MFCC), and fundamental frequency, as an input. But with the development of deep neural networks, traditional machine learning-based classification models are being replaced by deep neural networks. In recent years, there has been a focus on technologies that allow a vehicle to recognize changes in a driver's physical and emotional state and operate a function appropriate to a situation. For example, when it is determined that driver's cognition is inattentive as a result of recognizing an emotion of the driver, the vehicle may change the environment in the vehicle with warning messages, sound, lighting, air conditioning, and the like to attract attention. As a result, there is an active research effort to improve the performance of speech-based emotion recognition technologies in consideration of situations where the speaker is in a noisy vehicle and rapid emotion recognition and immediate action are required.

SUMMARY

An embodiment of the present disclosure can provide a method and a device for recognizing an emotion of a vehicle occupant that is optimized for a vehicle environment and minimizes delay time.

An example embodiment of the present disclosure provides a method of recognizing emotion of a vehicle occupant, the method can include: acquiring data in which speech of a vehicle occupant and noise of a vehicle is mixed; preparing, from the data, a first type of input data in the form of a latent vector; preparing, from the data, a second type of input data in the form of a Mel-Spectrogram; inputting the first type of input data and the second type of input data into an emotion classification model; and providing, based on an output of the emotion classification model, a result of classifying an emotion of the vehicle occupant.

In some example embodiments, the emotion classification model may include an ensemble model for a long short-term memory (LSTM) model processing the first type of input data and a convolutional neural network (CNN) model processing the second type of input data.

In some example embodiments, the first type of input data may be processed along a first path including an LSTM layer, a flatten layer, a rectified linear unit (ReLU) layer, a dropout layer, and a batch norm layer.

In some example embodiments, the second type of input data may be processed along a second path including a linear layer, a one-dimensional convolutional blocks (Conv1D blocks) layer, a flatten layer, and a batch normalization layer.

In some example embodiments, a result from the first path and a result from the second path may be input into a concatenation layer, combined, and then passed through a SoftMax layer to output a result of the classification of the emotion of the vehicle occupant.

In some example embodiments, the latent vector may be derived from a problem-agnostic speech encoder (PASE) neural network model trained with a dataset in which speech data of the vehicle occupant and noise data of the vehicle are synthesized.

In some example embodiments, an encoder of the PASE neural network model may include a SincNet layer, seven convolutional blocks (Conv blocks) layer, a one-dimensional convolution (Conv1D) layer, a batch normalization layer, and a flatten layer.

In some example embodiments, the convolution block layer may include a one-dimensional convolution (Conv1D) layer, a batch normalization layer, and a parametric rectified linear unit (PReLU) layer.

In some example embodiments, a decoder of the PASE neural network model may decode the latent vector into a worker associated with a plurality of feature points.

In some example embodiments, the plurality of feature points may include at least two of a log power spectrum (LPS) feature point, a mel-frequency cepstral coefficients (MFCC) feature point, a chroma feature point, a spectral feature point, and a temporal feature point.

An example embodiment of the present disclosure can provide a device for recognizing an emotion of a vehicle occupant, the device executing a program loaded in one or more memory devices through one or more processors, in which the program: acquires data in which speech of a vehicle occupant and noise of a vehicle are mixed; prepares, from the data, a first type of input data in the form of a latent vector; prepares, from the data, a second type of input data in the form of a Mel-Spectrogram; inputs the first type of input data and the second type of input data into an emotion classification model; and provides, based on an output of the emotion classification model, a result of classifying an emotion of the vehicle occupant.

In some example embodiments, the emotion classification model may include an ensemble model for a long short-term memory (LSTM) model processing the first type of input data and a convolutional neural network (CNN) model processing the second type of input data.

In some example embodiments, the first type of input data may be processed along a first path including an LSTM layer, a flatten layer, a rectified linear unit (ReLU) layer, a dropout layer, and a batch norm layer.

In some example embodiments, the second type of input data may be processed along a second path including a linear layer, a one-dimensional convolutional blocks (Conv1D blocks) layer, a flatten layer, and a batch normalization layer.

In some example embodiments, a result from the first path and a result from the second path may be input into a concatenation layer, combined, and then passed through a SoftMax layer to output a result of the classification of the emotion of the vehicle occupant.

In some example embodiments, the latent vector may be derived from a problem-agnostic speech encoder (PASE) neural network model trained with a dataset in which speech data of the vehicle occupant and noise data of the vehicle are synthesized.

In some example embodiments, an encoder of the PASE neural network model may include a SincNet layer, seven convolutional blocks (Conv blocks) layer, a one-dimensional convolution (Conv1D) layer, a batch normalization layer, and a flatten layer.

In some example embodiments, the convolution block layer may include a one-dimensional convolution (Conv1D) layer, a batch normalization layer, and a parametric rectified linear unit (PReLU) layer.

In some example embodiments, a decoder of the PASE neural network model may decode the latent vector into a worker associated with a plurality of feature points.

In some example embodiments, the plurality of feature points may include at least two of a log power spectrum (LPS) feature point, a mel-frequency cepstral coefficients (MFCC) feature point, a chroma feature point, a spectral feature point, and a temporal feature point.

According to example embodiments of the present disclosure, speech-based emotion recognition optimized for the vehicle environment robust to the vehicle noise can be provided, so that it can be possible to improve the accuracy of speaker emotion recognition and perform speaker emotion recognition quickly even in the noisy environment inside the vehicle. In particular, an example embodiment of the present disclosure can differ from the related art in that a model that is robust to vehicle noise can be trained for emotion classification of speaker's speech data occurring in a vehicle, and can add emotion-related feature points when the PASE neural network model is used to advance emotion classification. Further, the model in the related art extracts feature points for each speech section and inputs the extracted feature points into the model, resulting in a delay time. But according to example embodiments of the present disclosure, the PASE neural network model can be adopted to extract a latent vector having compressed information of emotions, and the delay time can be reduced to 0.06 seconds, which is applicable for a vehicle environment.

DETAILED DESCRIPTION OF ILLUSTRATIVE EMBODIMENTS

Figure 1:
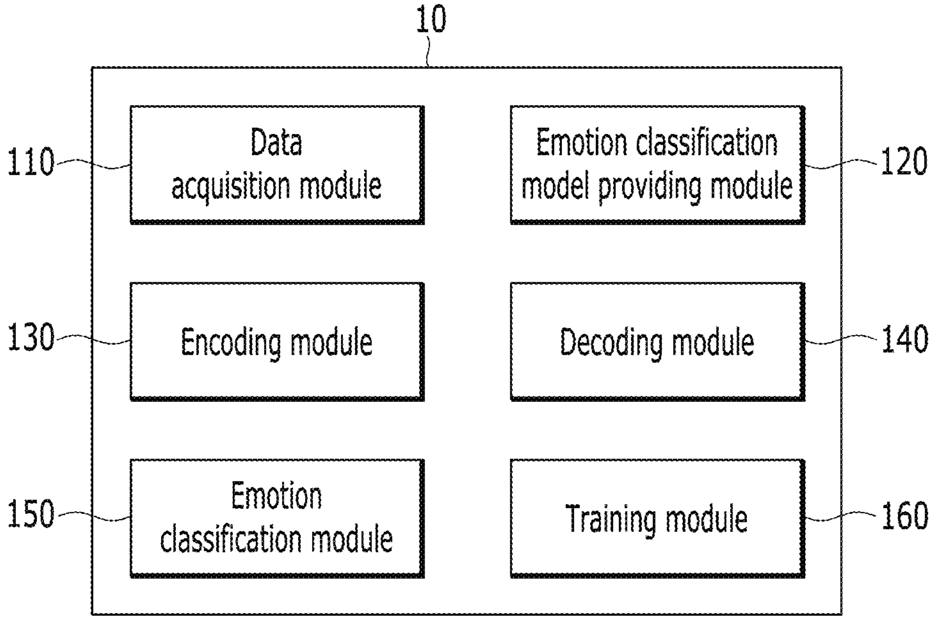
FIG. 1 is a block diagram illustrating a device for recognizing an emotion of a vehicle occupant according to an example embodiment of the present disclosure.

Hereinafter, example embodiments of the present disclosure will be described more fully hereinafter with reference to the accompanying drawings, in which example embodiments of the present disclosure are shown. As those skilled in the art can realize, the described example embodiments may be modified in various different ways, without departing from the spirit or scopes of the present disclosure. Accordingly, the drawings and description can be regarded as illustrative in nature and not necessarily restrictive. Like reference numerals can designate like elements throughout the specification.

Throughout the specification and the claims, unless explicitly described to the contrary, the word "comprise", and variations such as "comprises" or "comprising", can be understood to imply the inclusion of stated elements but not the exclusion of any other elements. Terms including an ordinary number, such as "first" and "second", can be used for describing various constituent elements, but the constituent elements are not necessarily limited by such terms. Such terms can be used merely to discriminate one constituent element from another constituent element.

Terms such as "part," "unit," "module," and the like, in the specification may refer to a unit capable of performing at least one function or operation described herein, which may be implemented in hardware or circuitry, software, or a combination of hardware or circuitry and software. In addition, at least some of the configurations or functions of a method and a device for recognizing an emotion of a vehicle occupant according to example embodiments described below may be implemented as programs or software, and the programs or software may be stored on a computer-readable medium.

FIG. 1 is a block diagram illustrating a device for recognizing an emotion of a vehicle occupant according to an example embodiment of the present disclosure.

Referring to FIG. 1, a device 10 for recognizing an emotion of a vehicle occupant according to an example embodiment may include one or more processors and one or more memory devices. For example, the device 10 for recognizing the emotion of the vehicle occupant may be implemented as a computing device 50, such as that described later with reference to FIG. 6. In this case, the one or more processors may correspond to a processor 510 of the computing device 50, and the one or more memory devices may correspond to a memory 530 of the computing device 50.

The one or more memory devices of the device 10 for recognizing the emotion may include a program executed by the one or more processors. The program may be executable to perform functions for performing emotion recognition of a vehicle occupant optimized for a vehicle environment and with minimal delay time, and for clarity and convenience of description, these functions are described herein by using the term "module".

The device 10 for recognizing the emotion may include a data acquisition module 110, an emotion classification model providing module 120, an encoding module 130, a decoding module 140, an emotion classification module 150, and a training module 160, any combination of or all of which may be in plural or may include plural components thereof.

The data acquisition module 110 may acquire data that is a mixture of speech of a vehicle occupant and noise of the vehicle. The noise of the vehicle may include, for example, engine noise including transmission, powertrain, and other mechanical noise, road surface noise coming from the ground through the tires, wind noise, which is a high frequency sound heard when the vehicle drives at high speeds with the windows closed, and the like. For example, the data acquisition module 110 may acquire mixture data of the speech and noise in real time through a recording device mounted in the vehicle. This acquired data may be input to the emotion classification model, which will be described later, and used to predict the emotion of the vehicle occupant.

The data acquisition module 110 may also synthesize and acquire speech data of a vehicle occupant and noise data of the vehicle and acquire the synthesized data. The data acquisition module 110 may synthesize data recorded from a human speech (male speech, female speech, and the like) and data recorded from engine noise, road surface noise, wind noise, and other noises at a signal to noise ratio (SNR) of 0 dB to 5 dB. The generated data may be used to train an emotion classification model, or a problem-agnostic speech encoder (PASE) neural network model, which will be described below. In some example embodiments, the data acquisition module 110 may extract synthesized data for use in training the emotion classification model at a selected, set, or predetermined time interval and then provide the training module 160 with the extracted synthesized data. For example, the data acquisition module 110 may extract the synthetic data from the synthetic data used for training the emotion classification model at a time interval of 150 ms in a section having an amplitude of a certain level or more (a section determined to be a speaker's utterance section), and provide the training module 160 with the extracted synthetic data.

The data acquisition module 110 may convert the acquired data into two types of input data for the emotion classification model. The two types of input data may include a first type of input data and a second type of input data. From the acquired data, the data acquisition module 110 may prepare the first type of input data in the form of a latent vector and the second type of input data in the form of a Mel-Spectrogram, and then input the first type of input data and the second type of input data into the emotion classification model.

The emotion classification model providing module 120 may provide an emotion classification model that is implemented in the form of an ensemble model for a long short-term memory (LSTM) model and a convolutional neural network (CNN) model. Both LSTM and CNN models are neural network architectures that may be used in the field of deep learning, but each model may be used to solve different types of data and problems. LSTM models are a type of recurrent neural network designed to model the sequential characteristic of data over time, and may control the flow of information through multiple gates including input gates, forgetting gates, and output gates, and may implement long-term memory through memory cells. Meanwhile, CNN models are mainly used for image recognition and processing, and may automatically learn and extract features of data having spatial hierarchy by using multiple layers of convolutional layers.

In the present example embodiment, the LSTM model may process the first type of input data and the CNN model may process the second type of input data. That is, the LSTM model may extract features from the data represented by the latent vector of the mixture of human speech and noise in the vehicle environment, and simultaneously, the CNN model may extract features from the data represented by the Mel-Spectrogram of the mixture of human speech and noise in the vehicle environment. After the features are extracted from the input data represented by different types of data by using different models, the respective features may be connected and formed into a tensor.

In some example embodiments, the first type of input data may be processed along a first path that includes an LSTM layer, a flatten layer, a rectified linear unit (ReLU) layer, a dropout layer, and a batch norm layer. Here, the flatten layer may be a layer that flattens multidimensional input data into a one-dimensional array, and the ReLU layer may be a layer for an activation function that may mitigate the gradient vanishing problem. A dropout layer may be a layer that randomly disables some of the neurons to prevent overfitting to prevent the neural network from relying excessively on specific neurons, and a batch normalization layer may be a layer that normalizes the mean and variance of the input data to mitigate the problem of internal co-variate shift in the neural network. Batch normalization may help with stable learning by adjusting the learnable scale and shift parameters.

The second type of input data may be processed along a second path that includes a linear layer, a one-dimensional convolutional blocks (Conv1D blocks) layer, a flatten layer, and a batch normalization layer. The linear layer may be a layer that performs a linear transformation on the input data, and the one-dimensional convolutional block layer may be a layer that performs a one-dimensional convolutional operation but further includes a batch normalization and a Parametric Rectified Linear Unit (PReLU) layer. Unlike ReLUs, which go completely to zero for negative number inputs, PRELUs may maintain the activation state of neurons by having a small gradient for negative number inputs, which may stabilize learning and enable the trained model to recognize more complex patterns. Furthermore, PReLUs may mitigate the gradient vanishing problem and improve the expressiveness of the model.

The results from the first path and the results from the second path may be input into a concatenation layer, combined, and then passed through a SoftMax layer to output a result of the classification of the emotion of the vehicle occupant. The SoftMax layer may convert the input values into a probability distribution so that the output value for each class may be interpreted as a probability.

A latent vector corresponding to the first type of input data may refer to a vector that represents hidden or embedded characteristics of the data. The latent vector is a compact representation of important information in the original data and may be used to capture essential characteristics of the data. In some example embodiments, the latent vectors may be derived from a PASE neural network model trained with a dataset in which speech data of a vehicle occupant and noise data of the vehicle are synthesized. A PASE neural network model is a type of neural network for extracting speech features, and a PASE neural network model may be implemented in an architecture that includes an encoder and a decoder.

The encoding module 130 may provide an encoder of the PASE neural network model. Specifically, the encoder may include a SincNet layer, seven convolutional block layers (Conv blocks), a one-dimensional convolution (Conv1D) layer, a batch normalization layer, and a flatten layer. Herein, one convolution block layer may be a compression unit that includes a one-dimensional convolution (Conv1D) layer, a batch normalization layer, and a parametric rectified linear unit (PReLU) layer. The SincNet layer may include a function that generates a normalized filter for a given frequency. In deep learning, a filter that takes frequency into account may be used by using the sinc function. The SincNet layer may analyze an audio signal that is a mixture of human speech and noise of the vehicle environment in the frequency domain by using the sinc function and extract the frequency characteristics included in the signal.

The decoding module 140 may provide a decoder of the PASE neural network model. Specifically, the decoder may decode the latent vector to a worker associated with a plurality of feature points. Herein, the workers exist to learn the encoder, and the plurality of feature points may include at least two of the log power spectrum (LPS) feature points, mel-frequency cepstral coefficients (MFCC) feature points, chroma feature points, spectral feature points, and temporal feature points.

When the encoder receives an input of data that is a mixture of human speech and noise of the vehicle environment and encodes the received data into a latent vector through the layers listed above, the worker, which will be described below, may restore the encoded latent vector to the original sound mixture of human speech and noise of the vehicle environment. For example, the worker may be transformed, that is, trained to fuse multiple feature point information into the latent vector generated by the encoder, and when the training is complete, the PASE neural network model may extract various and rich information from the data in which human speech and vehicle environment noise are mixed by using only the encoder with the worker removed.

A PASE network can be adopted to perform emotion recognition from the data in which the speech of the vehicle occupant and the noise of the vehicle environment are mixed, and the decoder through multi-task learning may recover LPS feature points, MFCC feature points, chroma feature points, spectral feature points, and temporal feature points that are considered relevant to speech and emotion. Emotion classification may be advanced by adding emotion-related feature points.

Multi-task learning may enable the model to reuse data and share training parameters by training the model with multiple tasks simultaneously, and enable the model to learn task-specific information separately while training the model to learn common features or structures across tasks, thereby improving data efficiency and learning speed. Multi-task learning may improve a generalization ability of the model by training the model with different tasks simultaneously. This is because information or patterns acquired from a certain task may be useful in other tasks. Accordingly, the performance and reliability of the model may be improved.

The emotion classification module 150 may input data in which the speech of the vehicle occupant and the noise of the vehicle acquired in real time from the vehicle environment, such as a driving environment, can be mixed to the emotion classification model, and can provide a result of classifying the emotion of vehicle occupant in real time according to the output of the emotion classification model.

The training module 160 may train the emotion classification model or a PASE neural network model by using the data that can be the mixture of the speech of the vehicle occupant and the noise of the vehicle.

Figure 2:
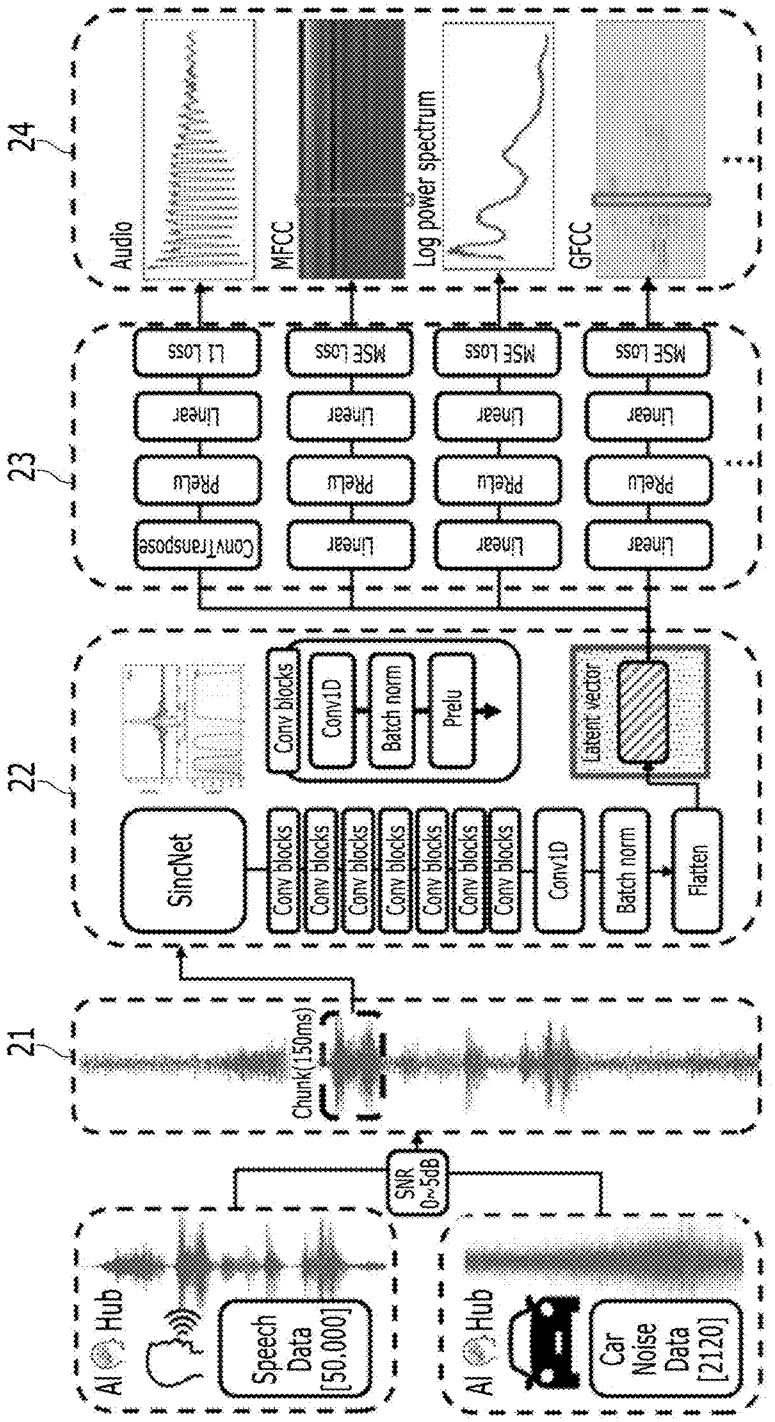
FIGS. 2 to 4 are diagrams illustrating an example implementation of a device for recognizing an emotion of a vehicle occupant according to an example embodiment of the present disclosure.
Figure 3:
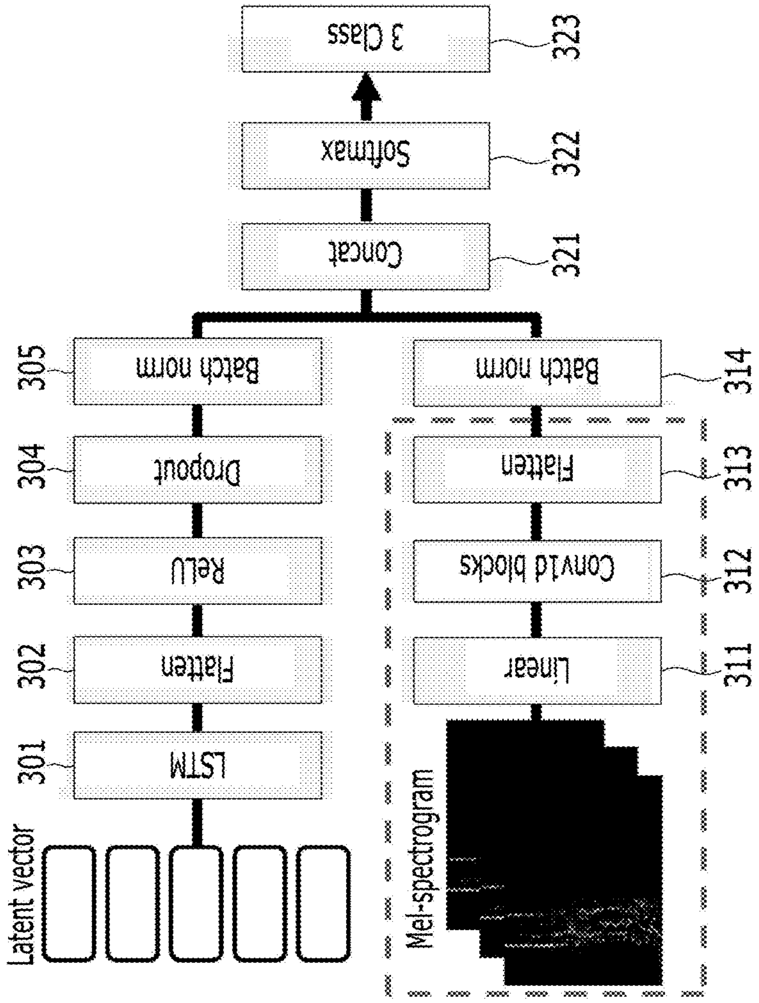
Figure 4:
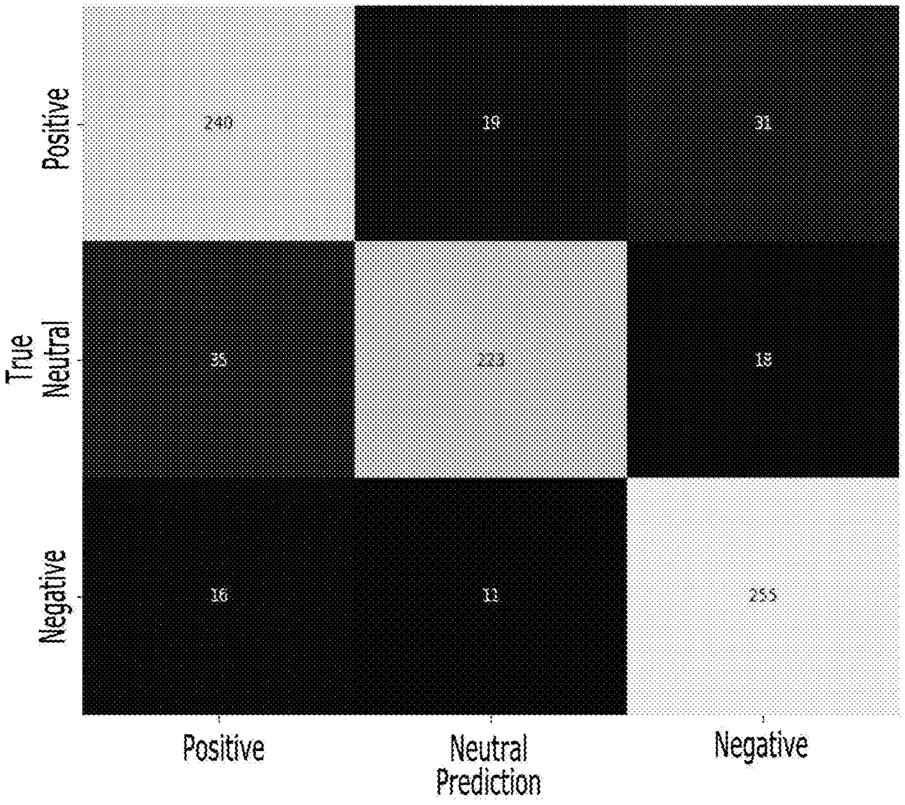

FIGS. 2 to 4 are diagrams illustrating an example implementation of the device for recognizing the emotion of the vehicle occupant according to an example embodiment of the present disclosure.

Referring to FIG. 2, a device 20 for recognizing an emotion of a vehicle occupant according to an example embodiment may perform an operation 21 of generating customized data for a vehicle environment, training operations 22 and 23 of extracting an emotion-based speech vector, and an operation 24 of extracting a speech feature of the vehicle occupant. In the operation 21 of generating the customized data for the vehicle environment, noise that may occur in the vehicle environment may be added to contribute to generating a model that is robust to vehicle noise. On the other hand, through the training operations 22 and 23 of extracting the emotion-based speech vector and the operation 24 of extracting the speech feature of the vehicle occupant, the PASE neural network model may be trained based on the speech features of the vehicle occupant to extract feature points to improve accuracy of the emotion classification.

Referring to FIG. 3, the emotion classification model 30, which can be implemented in the form of an ensemble model for the LSTM model and the CNN model, may receive input data in the form of latent vector acquired through the PASE neural network, and input data in the form of a Mel-Spectrogram to complement the speech feature points for total utterance duration. The input data in the form of the latent vector may be processed along a first path including an LSTM layer 301, a flatten layer 302, a ReLU layer 303, a dropout layer 304, and a batch normalization layer 305. The input data in the form of a Mel-Spectrogram may be processed along a second path including a linear layer 311, a one-dimensional convolutional block layer 312, a flatten layer 313, and a batch normalization layer 314. The results from the first path and the results from the second path may be input to a concatenation layer 321 to be combined, and subsequently, the combined result passes through a SoftMax layer 322 and a result 323 that classifies the emotions of the vehicle occupant into three types may be output. The emotion classification model 30 may result in improved emotion classification performance.

Referring to FIG. 4, which shows the classification results of ternary emotions of positive, true neutral, and negative, the performance of the emotion classification model was obtained with an F1 score of 0.83, and the processing time of the emotion classification model was only 0.06 seconds. This is because the model in the related art extracts feature points for each speech section and inputs the extracted feature points into the model, resulting in a delay time. But according to example embodiments of the present disclosure, the PASE neural network model can be adopted to extract a latent vector having compressed information of emotions, and the delay time can be reduced to 0.06 seconds, which is applicable to the vehicle environment.

Figure 5:
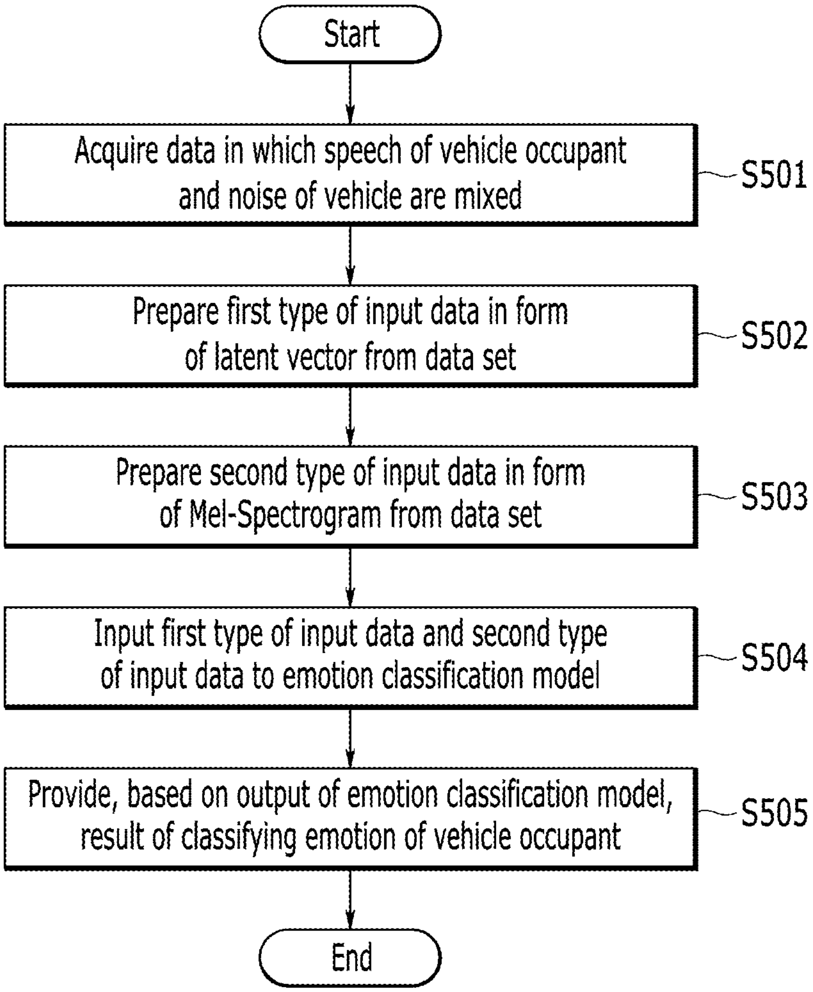
FIG. 5 is a flowchart illustrating a method of recognizing an emotion of a vehicle occupant according to an example embodiment of the present disclosure.

FIG. 5 is a flowchart illustrating a method of recognizing an emotion of a vehicle occupant according to an example embodiment of the present disclosure.

Referring now to FIG. 5, a method of recognizing an emotion of a vehicle occupant according to an example embodiment may include acquiring data in which speech of a vehicle occupant and noise of the vehicle are mixed (operation S501), preparing a first type of input data in the form of a latent vector from a data set (operation S502), preparing a second type of input data in the form of a Mel-Spectrogram from the data set (operation S503), inputting the first type of input data and the second type of input data to an emotion classification model (operation S504), and providing, based on an output of the emotion classification model, a result of classifying the emotion of the vehicle occupant (operation S505). For further details of the method, reference may be made to the description of the example embodiments described herein, so that duplicative descriptions can be omitted herein.

Figure 6:
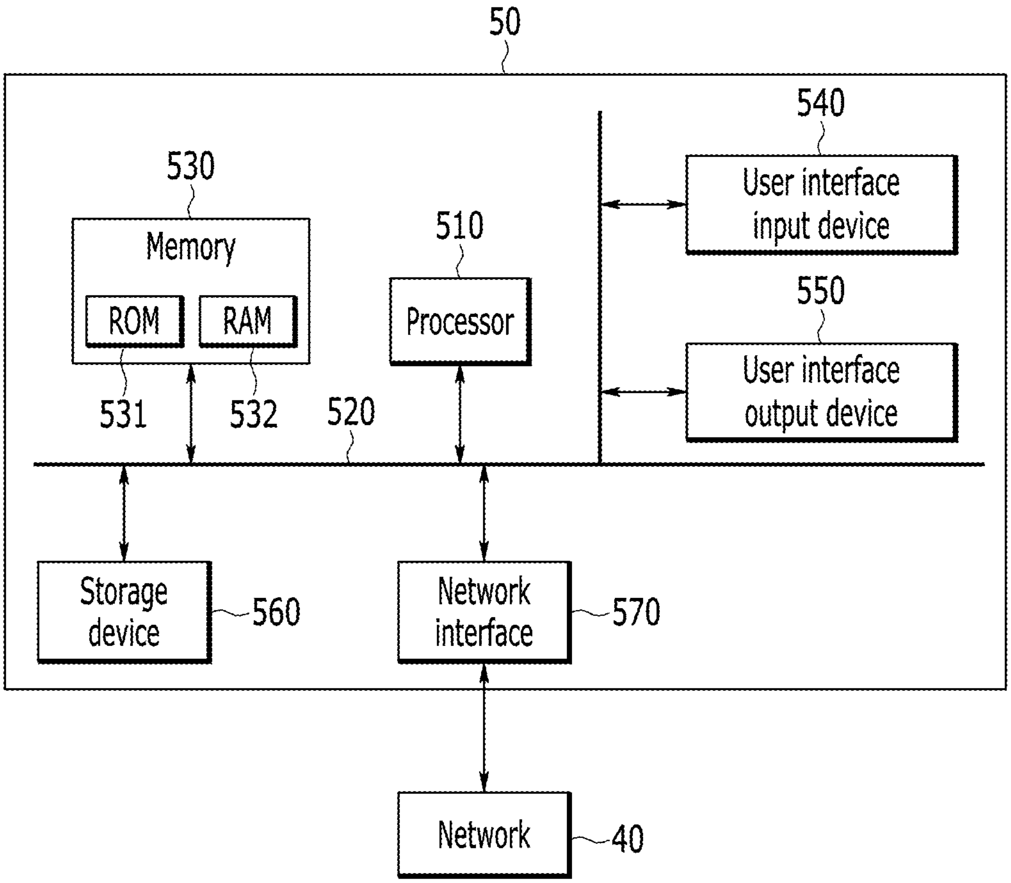
FIG. 6 is a diagram illustrating a computing device according to an example embodiment of the present disclosure.

FIG. 6 is a diagram illustrating a computing device according to an example embodiment of the present disclosure.

Referring now to FIG. 6, the method and the device for recognizing the emotion of the vehicle occupant according to example embodiments may be implemented by using a computing device 50.

The computing device 50 may include at least one of a processor 510, a memory 530, a user interface input device 540, a user interface output device 550, and a storage device 560 communicating via a bus 520, any combination of or all of which may be in plural or may include plural components thereof. The computing device 50 may also include a network interface 570 electrically connected to the network 40. The network interface 570 may transmit or receive a signal with another entity through the network 40.

The processor 510 may be implemented in various types, such as a micro controller unit (MCU), an application processor (AP), a central processing unit (CPU), a graphic processing unit (GPU), a Neural processing unit (NPU), a quantum processing unit (QPU), and the like, and may be a selected, set, or predetermined semiconductor device executing instructions stored in the memory 530 or the storage device 560. The processor 510 may be configured to implement the function and the method described above with reference to FIGS. 1 to 5.

The memory 530 and the storage device 560 may include various forms of volatile or non-volatile storage media. For example, the memory may include a Read Only Memory (ROM) 531 and a Random Access Memory (RAM) 532. In the example embodiment, the memory 530 may be located inside or outside the processor 510, and the memory 530 may be connected with the processor 510 through already known various ways, for example.

In some example embodiments, at least some configurations or functions of the method and the device for recognizing the emotion of the vehicle occupant according to example embodiments may be implemented as programs or software executed on the computing device 50, and the programs or software may be stored on a computer-readable medium. Specifically, a computer-readable medium according to an example embodiment may record a program for executing the operations included in an implementation of the method and the device for recognizing the emotion of the vehicle occupant according to example embodiments on a computer including the processor 510 executing a program or instructions stored in the memory 530 or the storage device 560.

In some example embodiments, at least some configurations or functions of the method and the device for recognizing an emotion of a vehicle occupant according to example embodiments may be implemented using hardware or circuit of the computing device 50, or may be implemented as separate hardware or circuit that may be electrically connected to computing device 50.

According to example embodiments, speech-based emotion recognition optimized for the vehicle environment robust to the vehicle noise can be provided, so that it can be possible to improve the accuracy of speaker emotion recognition and perform speaker emotion recognition quickly even in the noisy environment inside the vehicle. In particular, the present disclosure differs from the related art in that a model that is robust to vehicle noise can be trained for emotion classification of speaker's speech data occurring in a vehicle, and can add emotion-related feature points when the PASE neural network model is used to advance emotion classification. Further, the model in the related art extracts feature points for each speech section and inputs the extracted feature points into the model, resulting in a delay time. But according to example embodiments, the PASE neural network model can be adopted to extract a latent vector having compressed information of emotions, and the delay time can be reduced to 0.06 seconds, which is applicable to the vehicle environment.

Although the above example embodiments of the present disclosure have been described in detail, the scopes of the present disclosure are not necessarily limited thereto, but also can include various modifications and improvements, and equivalents, by one of ordinary skill in the art utilizing the basic concepts of the present disclosure as defined in the following claims.

What is claimed is:

1. A method of recognizing emotion of a vehicle occupant, the method comprising:
- acquiring data in which speech of a vehicle occupant and noise of a vehicle are mixed;
- preparing, from the acquired data, a first type of input data in a form of a latent vector,
  - wherein the latent vector is derived from an encoder of a problem-agnostic speech encoder (PASE) neural network model trained with a dataset in which speech data of the vehicle occupant and noise data of the vehicle are synthesized, and
  - wherein, during training, a decoder of the PASE neural network model decodes the latent vector into a worker that reconstructs a plurality of feature points including at least two of a log power spectrum (LPS) feature point, a mel-frequency cepstral coefficients (MFCC) feature point, a chroma feature point, a spectral feature point, or a temporal feature point from the latent vector;
- preparing, from the acquired data, a second type of input data in the form of a Mel-Spectrogram;
- inputting the first type of input data and the second type of input data into an emotion classification model; and
- providing, based on an output of the emotion classification model, a result of classifying an emotion of the vehicle occupant.

2. The method of claim 1, wherein the emotion classification model includes an ensemble model for a long short-term memory (LSTM) model processing the first type of input data and a convolutional neural network (CNN) model processing the second type of input data.

3. The method of claim 1, further comprising processing the first type of input data along a first path including an LSTM layer, a flatten layer, a rectified linear unit (ReLU) layer, a dropout layer, and a batch norm layer.

4. The method of claim 3, further comprising processing the second type of input data along a second path including a linear layer, a one-dimensional convolutional blocks (Conv1D blocks) layer, a flatten layer, and a batch normalization layer.

5. The method of claim 4, further comprising inputting a first result from the first path and a second result from the second path into a concatenation layer, combining, and then passing through a SoftMax layer to output a third result of the classification of the emotion of the vehicle occupant.

6. The method of claim 1, wherein an encoder of the PASE neural network model includes a SincNet layer, seven convolutional blocks (Conv blocks) layer, a one-dimensional convolution (Conv1D) layer, a batch normalization layer, and a flatten layer.

7. The method of claim 6, wherein the convolution block layer includes a one-dimensional convolution (Conv1D) layer, a batch normalization layer, and a parametric rectified linear unit (PReLU) layer.

8. The method of claim 1, wherein the dataset used to train the PASE neural network model is generated by synthesizing speech data of the vehicle occupant with noise data of the vehicle at a signal-to-noise ratio of 0 dB to 5 dB.

9. The method of claim 1, wherein the noise data of the vehicle includes at least one of engine noise, road surface noise, and wind noise.

10. The method of claim 1, wherein the acquired data is obtained in real time through a recording device mounted in the vehicle, and the result of classifying the emotion is provided in real time.

11. A device for recognizing an emotion of a vehicle occupant, the device comprising:
- one or more processors; and
- a storage medium storing computer-readable instructions that, when executed by the one or more processors, cause the one or more processors to:
- acquire data in which speech of a vehicle occupant and noise of a vehicle are mixed;
- prepare, from the acquired data, a first type of input data in the form of a latent vector,
  - wherein the latent vector is derived from a problem-agnostic speech encoder (PASE) neural network model trained with a dataset in which speech data of the vehicle occupant and noise data of the vehicle are synthesized, and
  - wherein, during training, a decoder of the PASE neural network model decodes the latent vector into a worker that reconstructs a plurality of feature points including at least two of a log power spectrum (LPS) feature point, a mel-frequency cepstral coefficients (MFCC) feature point, a chroma feature point, a spectral feature point, or a temporal feature point from the latent vector;
- prepare, from the acquired data, a second type of input data in the form of a Mel-Spectrogram;
- input the first type of input data and the second type of input data into an emotion classification model; and
- provide, based on an output of the emotion classification model, a result of classifying an emotion of the vehicle occupant.

12. The device of claim 11, wherein the emotion classification model includes an ensemble model for a long short-term memory (LSTM) model processing the first type of input data and a convolutional neural network (CNN) model processing the second type of input data.

13. The device of claim 11, wherein the instructions further cause the one or more processors to process the first type of input data along a first path including an LSTM layer, a flatten layer, a rectified linear unit (ReLU) layer, a dropout layer, and a batch norm layer.

14. The device of claim 13, wherein the instructions further cause the one or more processors to process the second type of input data along a second path including a linear layer, a one-dimensional convolutional blocks (Conv1D blocks) layer, a flatten layer, and a batch normalization layer.

15. The device of claim 14, wherein the instructions further cause the one or more processors to input a first result from the first path and a second result from the second path into a concatenation layer, combine, and then pass through a SoftMax layer to output a third result of the classification of the emotion of the vehicle occupant.

16. The device of claim 11, wherein an encoder of the PASE neural network model includes a SincNet layer, seven convolutional blocks (Conv blocks) layer, a one-dimensional convolution (Conv1D) layer, a batch normalization layer, and a flatten layer.

17. The device of claim 16, wherein the convolution block layer includes a one-dimensional convolution (Conv1D) layer, a batch normalization layer, and a parametric rectified linear unit (PReLU) layer.

18. The device of claim 11, wherein the dataset used to train the PASE neural network model is generated by synthesizing speech data of the vehicle occupant with noise data of the vehicle at a signal-to-noise ratio of 0 dB to 5 dB.

19. The device of claim 11, wherein the noise data of the vehicle includes at least one of engine noise, road surface noise, and wind noise.

20. The device of claim 11, wherein the instructions further cause the one or more processors to acquire the data in real time through a recording device mounted in the vehicle, and provide the result of classifying the emotion in real time.

* * * * *